(12) United States Patent
Tasche et al.

(10) Patent No.: US 10,684,148 B2
(45) Date of Patent: Jun. 16, 2020

(54) TEMPERATURE COMPENSATION FOR EDDY CURRENT SENSORS

(71) Applicant: EPRO GMBH, Gronau (DE)

(72) Inventors: G. Peter Tasche, Gronau (DE); Michael Schlereth, Travenbrück (DE); Ulf Overkamp, Gronau (DE)

(73) Assignee: EPRO GMBH, Gronau (DE)

( * ) Notice: Subject to any disclaimer, the term of this patent is extended or adjusted under 35 U.S.C. 154(b) by 204 days.

(21) Appl. No.: 16/031,197

(22) Filed: Jul. 10, 2018

(65) Prior Publication Data

US 2020/0018624 A1 Jan. 16, 2020

(51) Int. Cl.
*G01D 3/028* (2006.01)
*G01D 18/00* (2006.01)
*G01D 5/20* (2006.01)

(52) U.S. Cl.
CPC .......... *G01D 18/00* (2013.01); *G01D 5/2006* (2013.01)

(58) Field of Classification Search
CPC ......... G01D 18/00; G01D 5/20; G01D 5/2006
USPC .......................... 324/202, 225, 228–238, 374
See application file for complete search history.

(56) References Cited

U.S. PATENT DOCUMENTS

| | | | |
|---|---|---|---|
| 1,722,758 A | 7/1929 | Martin | |
| 3,378,763 A | 4/1968 | Hastings | |
| 4,673,870 A * | 6/1987 | Strickland | G01R 35/005 324/130 |
| 4,847,794 A * | 7/1989 | Hrubes | G01D 3/02 702/86 |
| 4,893,079 A | 1/1990 | Kustra | |
| 5,767,670 A * | 6/1998 | Maher | G01D 3/028 324/207.12 |
| 5,854,553 A | 12/1998 | Barclay | |
| 6,346,807 B1 | 2/2002 | Slates | |
| 6,819,122 B2 | 11/2004 | Slates | |
| 6,867,585 B2 | 3/2005 | Hrubes | |
| 7,162,384 B1 | 1/2007 | Browning | |
| 7,324,908 B2 | 1/2008 | Browning | |

(Continued)

FOREIGN PATENT DOCUMENTS

WO 9500818 1/1995

*Primary Examiner* — Melissa J Koval
*Assistant Examiner* — Courtney G McDonnough
(74) *Attorney, Agent, or Firm* — Luedeka Neely Group, P.C.; Rick Barnes (57) ABSTRACT

A method for calibrating an eddy current sensor for temperature. Both frequency and one of voltage and current of an oscillator driving the eddy current sensor are measured at a plurality of temperatures and a plurality of target surface distances. Temperature equations are regressed to fit the measured frequency and one of the voltage and the current for each temperature, where the temperature equations have a common number of equivalent factors, and factor equations are regressed for each of the equivalent factors. A gain adjustment and an offset adjustment pair for each of the plurality of temperatures is determined for an oscillator associated with the eddy current sensor, that compensates an output of the eddy current sensor to a standard temperature. A gain equation is regressed to fit the determined gain adjustments, and an offset equation is regressed to fit the determined offset adjustments. The temperature equations, factor equations, gain equation, and offset equation are provided with the eddy current sensor.

2 Claims, 13 Drawing Sheets

(56) References Cited

U.S. PATENT DOCUMENTS

| | | |
|---|---|---|
| 7,768,258 B2 | 8/2010 | Dobsky |
| 8,395,377 B2 | 3/2013 | Huggett |
| 9,007,053 B2 | 4/2015 | Thomas |
| 9,389,324 B2 | 7/2016 | Amerine |

\* cited by examiner

TEMPERATURE COMPENSATION FOR EDDY CURRENT SENSORS

FIELD

This invention relates to the field of electronic sensors. More particularly, this invention relates to compensating for temperature differences in eddy current sensor measurements.

INTRODUCTION

Eddy current sensors are often used to determine certain characteristics of a target surface or the distance of the coil to that surface. Eddy current sensors operate by applying an alternating current to a coil in the sensor to create a primary magnetic field. The primary magnetic field tends to induce small currents in the target surface, which are called eddy currents. The eddy currents themselves create eddy magnetic fields that affect the impedance of the coil to some degree. This effect on the impedance can be measured directly or can be measured on other parameters that are affected by coil impedance.

The degree of interaction between the eddy fields and the primary field as described above is dependent upon several factors, such as the distance between the sensor and the target, the material from which the target is formed, and the ambient temperature at which the measurement is taken.

In many cases, the material from which the target is formed is known, and the desired output of the measurement is the distance between the target and the sensor. This can be especially valuable for reading vibration or eccentricity in a rotating shaft.

However, in order to have precise measurements, the temperature at which the measurements are taken must either be held at a known constant or measured. It is often very difficult to hold the temperature constant in the environment in which such measurements are desired, and so, in some application, it is desirable to measure the temperature.

While there are many different methods for measuring temperature, these methods typically require additional temperature sensors or separate temperature-measuring circuits, any of which tend to increase the cost and complexity of obtaining the desired distance measurements.

What is needed, therefore, is a system that tends to reduce issues such as those described above, at least in part.

SUMMARY

The above and other needs are met by a method for calibrating an eddy current sensor for temperature. Both frequency and one of voltage and current of an oscillator driving the eddy current sensor are measured at a plurality of temperatures and a plurality of target surface distances. Temperature equations are regressed to fit the measured frequency and one of the voltage and the current for each temperature, where the temperature equations have a common number of equivalent factors, and factor equations are regressed for each of the equivalent factors. A gain adjustment and an offset adjustment pair for each of the plurality of temperatures is determined for an oscillator associated with the eddy current sensor, that compensates an output of the eddy current sensor to a standard temperature. A gain equation is regressed to fit the determined gain adjustments, and an offset equation is regressed to fit the determined offset adjustments. The temperature equations, factor equations, gain equation, and offset equation are provided with the eddy current sensor.

According to another aspect of the invention there is described a method for correcting an eddy current sensor for temperature by reading the frequency and one of the voltage and the current of an oscillator associated with the eddy current sensor. The frequency and the one of voltage and current are input into provided temperature equations to determine a temperature, and the temperature is input to a provided a gain equation to determine a gain adjustment. The temperature is input to a provided offset equation to determine an offset adjustment, and the oscillator is adjusted using the gain adjustment and the offset adjustment.

According to yet another aspect of the invention there is described a method for calibrating and correcting an eddy current sensor for temperature. The eddy current sensor is calibrated by measuring both frequency and one of voltage and current of an oscillator driving the eddy current sensor at a plurality of temperatures and a plurality of target surface distances. Temperature equations are regressed to fit the measured frequency and one of the voltage and the current for each temperature, where the temperature equations have a common number of equivalent factors. Factor equations are regressed for each of the equivalent factors. For an oscillator associated with the eddy current sensor, determine a gain adjustment and an offset adjustment pair for each of the plurality of temperatures that compensates an output of the eddy current sensor to a standard temperature. A gain equation is regressed to fit the determined gain adjustments, and an offset equation is regressed to fit the determined offset adjustments. The temperature equations, factor equations, gain equation, and offset equation are provided with the eddy current sensor. The eddy current sensor is corrected by reading frequency and one of voltage and current of an oscillator associated with the eddy current sensor at an unknown temperature. The frequency and the one of voltage and current is input to the provided temperature equations to determine the unknown temperature. The determined temperature is input to the provided gain equation to determine a gain adjustment, and into the provided offset equation to determine an offset adjustment. The oscillator is adjusted using the gain adjustment and the offset adjustment.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 9:
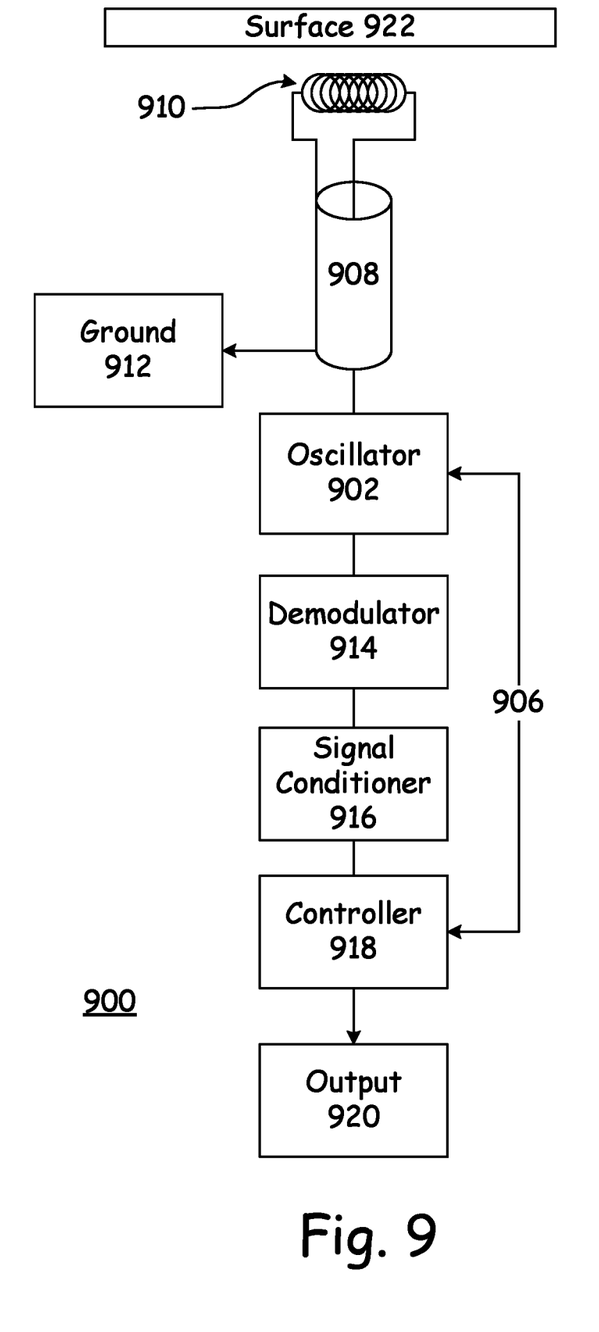
FIG. 9 is a schematic diagram of an eddy current sensor chain according to an embodiment of the present invention.

With reference now to FIG. 9, there is depicted a schematic diagram of an eddy current sensor chain 900 according to an embodiment of the present invention. The sensor chain 900 includes an oscillator 902 that delivers an alternating current through an electrical conductor 908 to a coil 910. The alternating current in the coil 910 produces eddy currents in the surface 922, as described elsewhere herein. In some embodiments the electrical conductor 908 is cable, such as a shielded coaxial or triaxial cable, where the alternating current from the oscillator 902 is delivered to the coil 910 through the inner conductor, and the outer conductor is connected to a ground 912.

In some embodiments the oscillator 902 is a free-running oscillator which means that there is no feedback loop to the electrical inputs on the oscillator 902 to create a constant frequency of oscillation on the output. Stated another way, changes in the impedance in the coil 910 or cable 908 will change the frequency that is output by the oscillator 902. This is quite different from the design of many other eddy current sensors. Changes in the material of the surface 922 and temperature of the surface 922 and sensor chain 900 also effect the frequency of oscillation of the oscillator 902.

In one embodiment, the signal that results from the interaction of the oscillator 902, coil 910, and cable 908 is passed through a demodulator 914 and signal conditioner 916 before exiting the eddy current sensor chain 900 through the output 920.

The hardware as described above is not always a part of the small device that many would refer to as an eddy current sensor, but comprises what could be called the sensor chain of electronics that connect to the coil 910. In some embodiments, the coil 910 itself is the only part that is included in the small package that is considered to be the sensor, and all other elements as depicted and described are more remotely located. However, for convenience herein, the sensor chain 900 as depicted in FIG. 9 is sometimes referred to as the eddy current sensor 900, or just sensor 900.

Somewhere in the sensor chain 900 there is what is called herein a controller 918. The location of the controller 918 in one embodiment is depicted in FIG. 9, but the controller 918 could be disposed in other locations as well. The functions of the controller 918 in one embodiment include substantially-simultaneously measuring the frequency output by the oscillator 902 and the voltage from the sensor 910 according to some sampling rate, and providing the measurements on the output 920. As described in more detail below, these measurements are used to both determine the distance between the coil 910 and the surface 922 and determine the effective temperature of the sensor 900.

As introduced above, the oscillator 902 frequency and voltage are influenced by changing ambient temperatures. When the other influencing variables (material of the surface 922 and other sensor 900 characteristics) are known, the ambient temperature can be determined from oscillator frequency and oscillation circuit voltage.

In some embodiments of the present invention the two variables of electrical quality and frequency are read, and thus the apparatus 900 is able to determine what could be called the influencing variables of temperature and sensor distance. The so-called electrical quality is measured by one of either the voltage or the current of the oscillator 902, depending on the type of resonant circuit (voltage for a parallel sensor 910 and current for a series sensor 910). In this discussion we use the example of voltage and a parallel sensor 908 throughout. However, it is appreciated that the methods described herein are similarly applicable to measuring current instead of voltage for a series sensor 908.

Since the system is undefined, the desired influencing variables are determined by two measured variables, and so additional boundary conditions are specified as follows. When the sensor chain 900 is put into operation, the sensor 908 behavior is determined at a standard temperature and with a standard material. The material is then measured again at standard temperature and compensated accordingly. If a measurement at standard temperature is not possible, then the measurement is made at a known temperature and the measured values are recalculated to standard temperature. The measuring distance is now set to the sensor 908 and the material of the surface 922, so that only the parameters distance and temperature are to be recorded and processed.

To detect different temperatures, the behavior of the oscillator frequency has a monotonic function over the operating temperature range at a constant distance from the coil 910 to the surface 922, either monotonically increasing or monotonically decreasing. This can be ensured, in some embodiments, by the electrical properties of the coil 910. This is not possible with every coil 910 type. If ferrites are used in the coil 910, they must be selected in such a way that they also support the monotonic functions of the frequency response.

Figure 1:
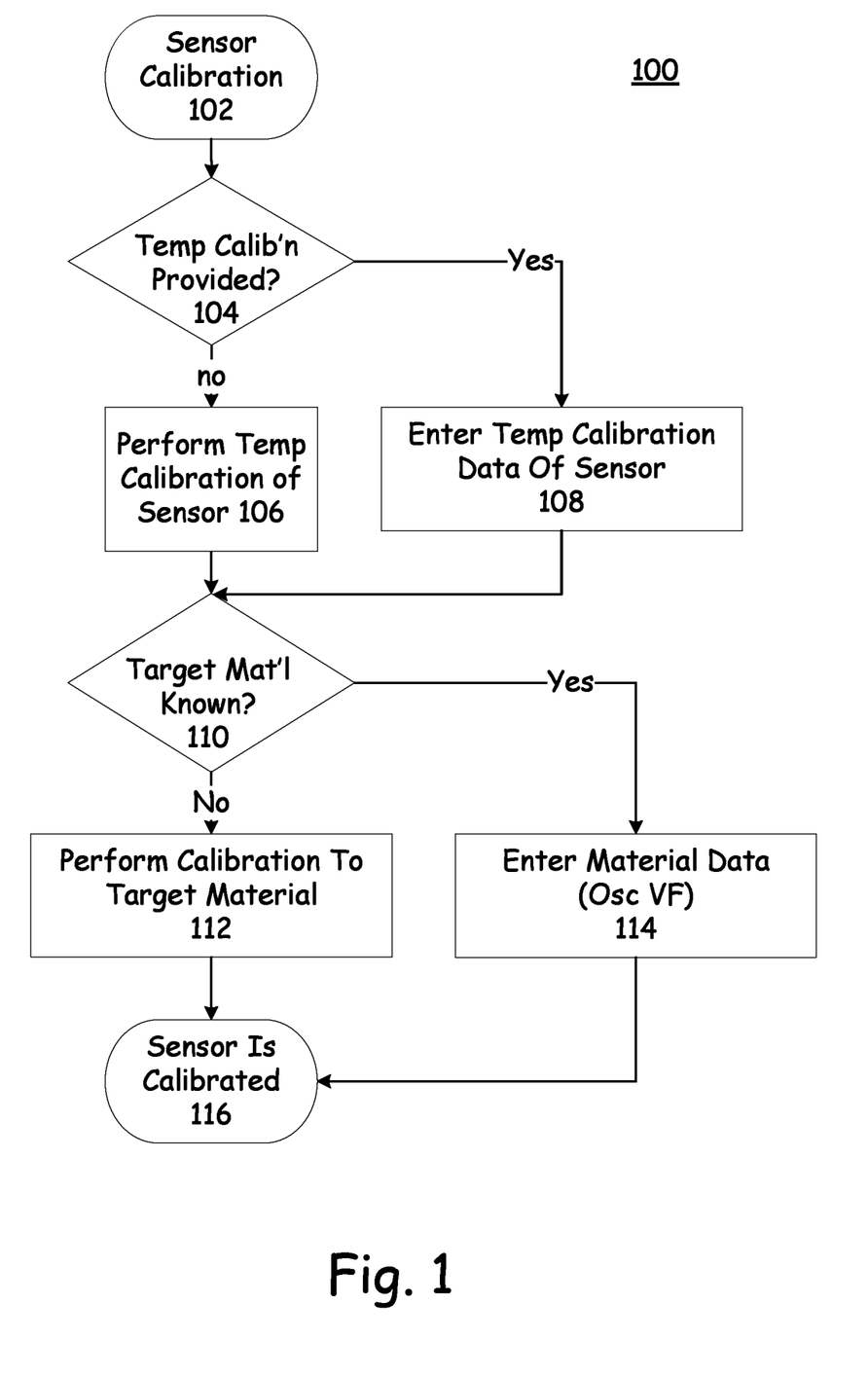
FIG. 1 is a flow-chart for calibrating an eddy current sensor according to an embodiment of the present invention.

With reference now to FIG. 1 there is depicted a flowchart of the overall method 100 for the calibration 102 of a sensor chain 900 according to an embodiment of the present invention. In some embodiments, the temperature calibration data is already provided, as determined in block 104. If it is not, then the temperature calibration is performed as given in block 106, described in more detail hereafter. If it is provided, then the temperature calibration data for the sensor 900 is merely input to the controller 918, as given in block 108.

Next, it is determined in block 110 whether the material of the surface 922 is known, and whether the information in regard to the surface 922 is provided. If not, then the calibration procedure 112 of the sensor chain 900 to the material of the target surface 922 is performed, as given in block 112, and explained in more detail hereafter. If the information is provided, then the oscillator 902 voltage and frequency (OSC VF) calibration data associated with the surface 922 material is entered into the controller 918, as given in block 114. At this point, the sensor chain 900 is calibrated, as given in block 116.

Figure 2:
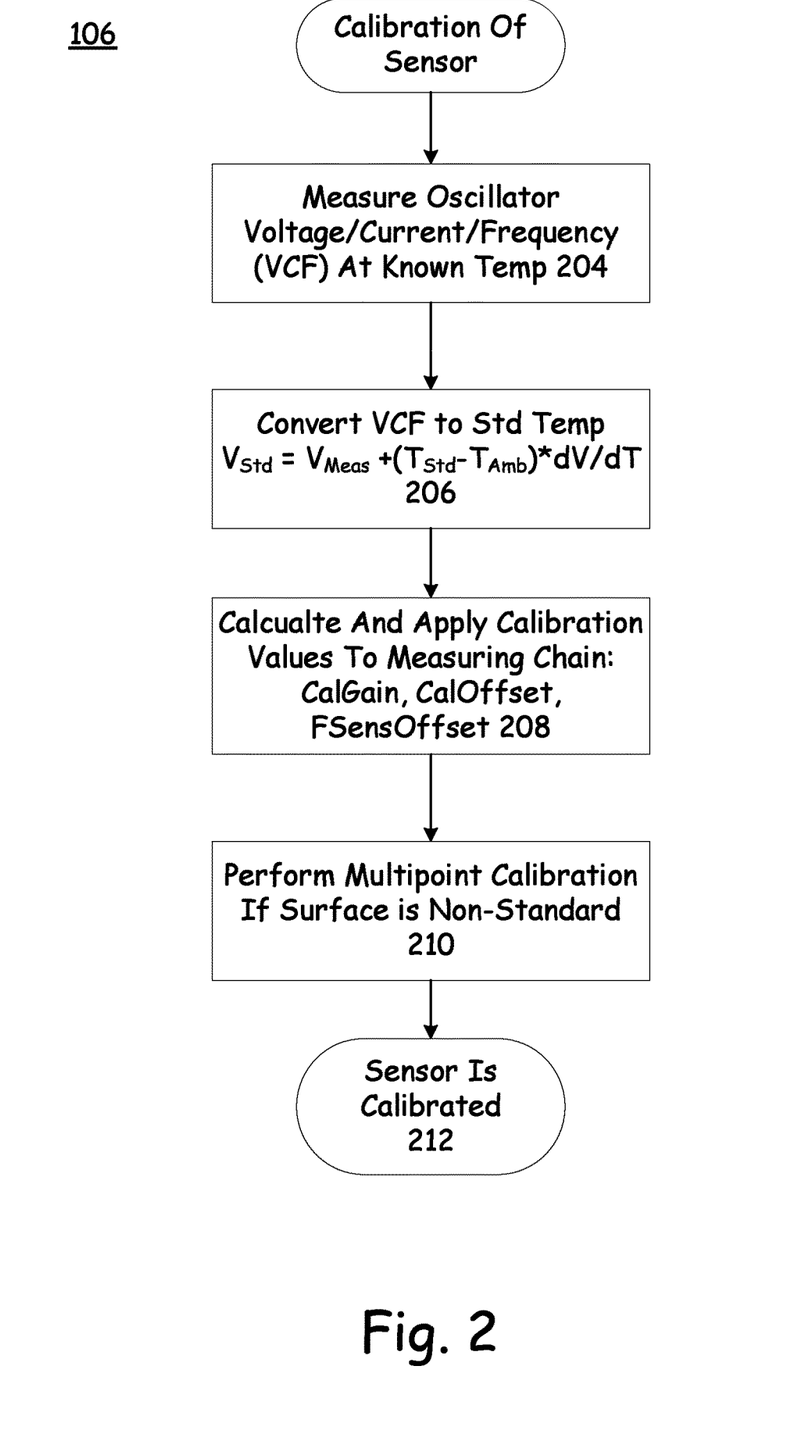
FIG. 2 is a flow-chart for calibrating an eddy current sensor for temperature according to an embodiment of the present invention.

With reference now to FIG. 2, a more detailed description of the calibration procedure 106 in regard to the temperature variations of the sensor chain 900 is provided. Beginning in block 204, the oscillator voltage, current, and frequency (VCF) is measured at a known ambient temperature, or at a standard temperature such as 23 centigrade. The equation to convert the measurements to the standard temperature is given in block 206. These calibration values are applied to the parameters of the equation that predict the output of the sensor chain 900, such as the calibration gain, calibration offset, and frequency sensor offset, as given in block 208. If the shape of the target surface 922 is non-standard, then a multipoint calibration is performed, as given in block 210. At this point, the sensor chain 900 is temperature calibrated, as given in block 212.

Figure 3:
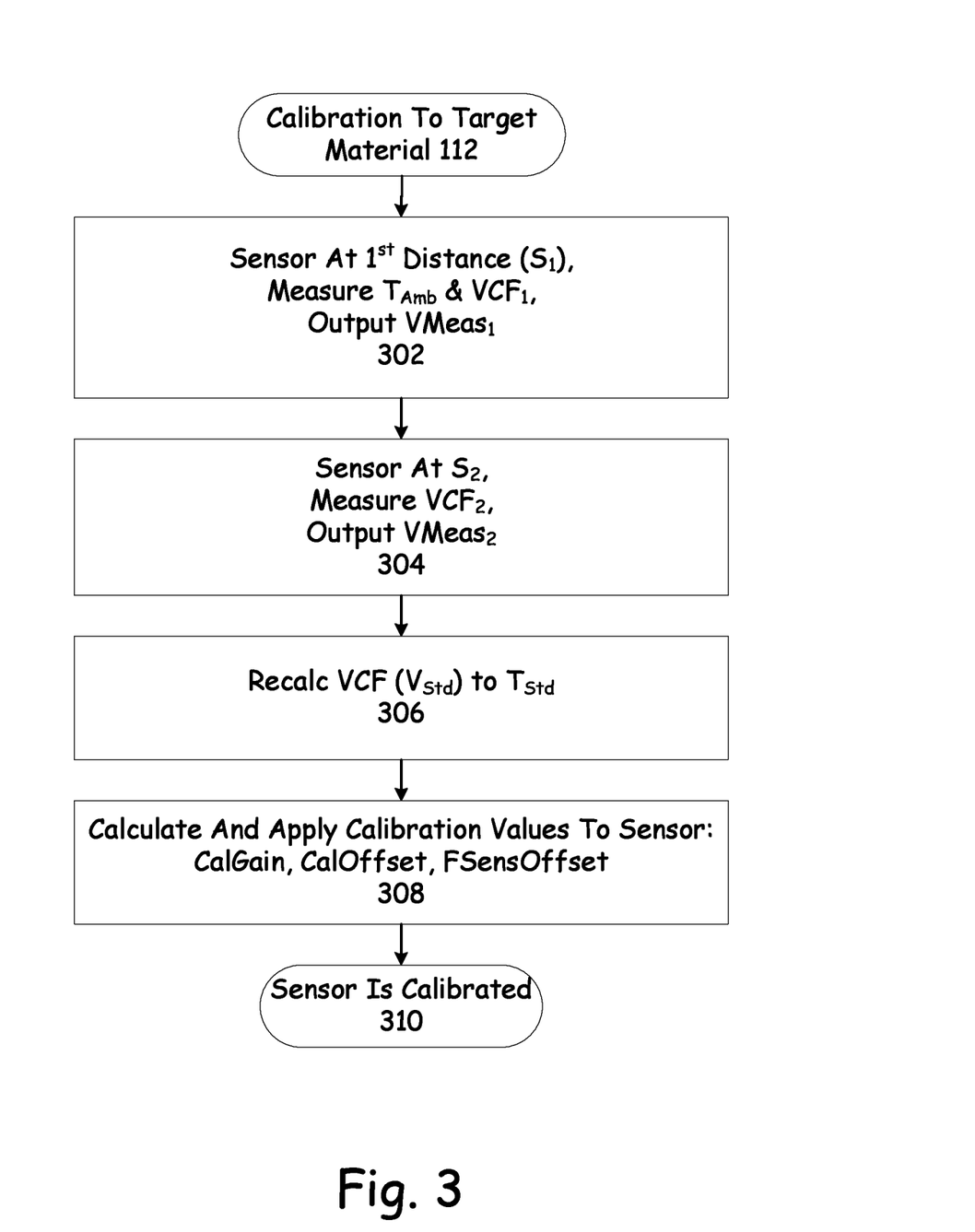
FIG. 3 is a flow-chart for calibrating an eddy current sensor for target material according to an embodiment of the present invention.

With reference now to FIG. 3, the sensor 900 can also be calibrated, as desired, to a specific surface 922 material, as given in method 112. In a similar manner to that as described above, the sensor coil 910 is positioned at a known distance from the surface 922, the ambient temperature is measured, and the voltage or current, and frequency of the oscillator 902, and the voltage at the output of the demodulator 914 are measured, as given in block 302. The sensor coil 902 is then moved to a second known distance from the surface 922, and the same parameters are measured a second time, as given in block 304. This enables a calibration of the voltage, current, and frequency measurements to a selected standard temperature, as given in block 306. As in previous calibration routines, these values are applied to the gains and offsets of the sensor chain 900, as given in block 308, and which point the sensor chain 900 is calibrated, as given in block 310.

Figure 10:
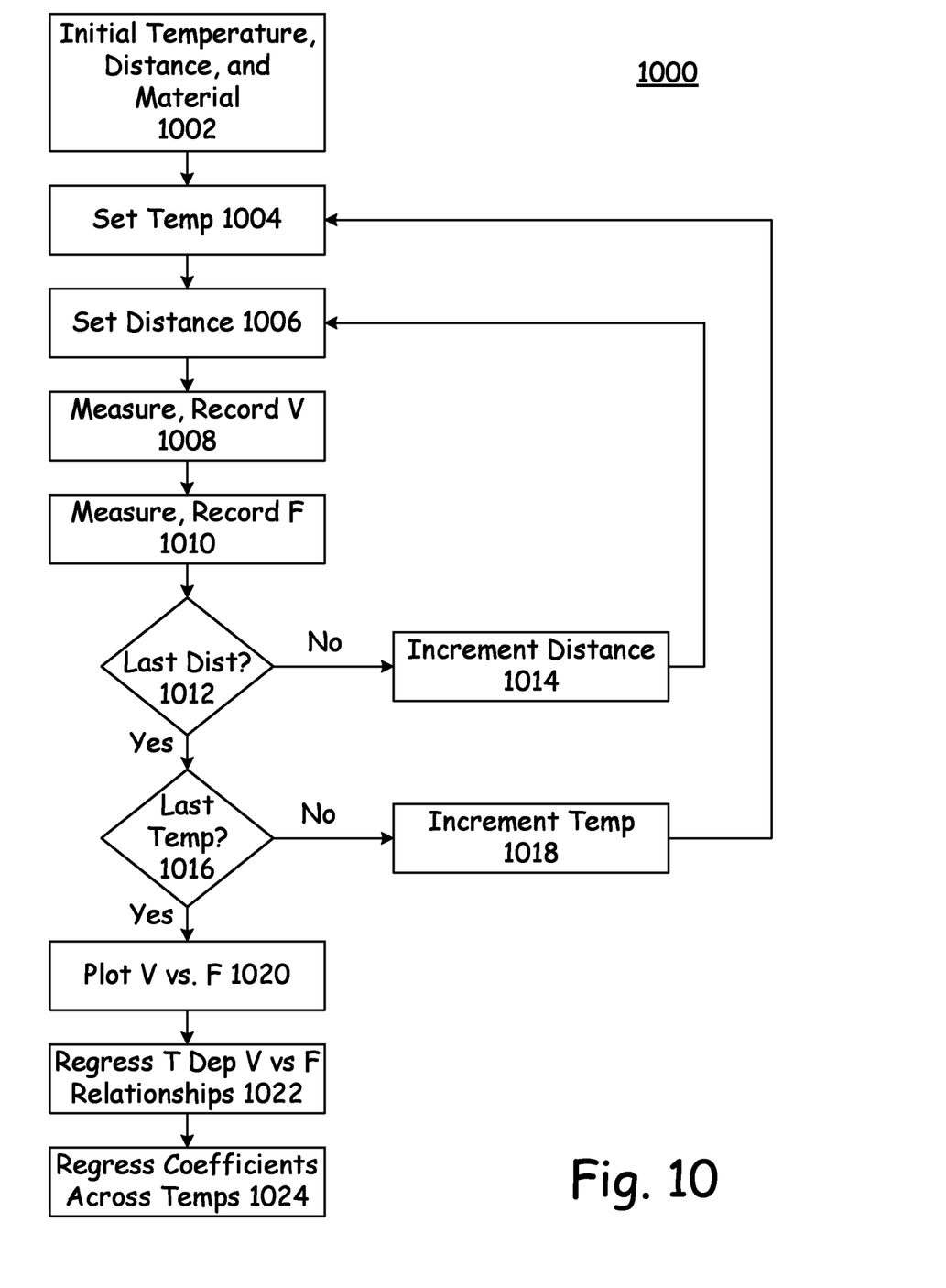
FIG. 10 is a flow-chart for calibrating an eddy current sensor according to another embodiment of the present invention.

Another flowchart for an overall method 1000 to determine the temperature—voltage—distance characteristic of a reference sensor chain is given in FIG. 10. According to this method, an initial temperature of the sensor chain 900 is set, along with an initial distance of the sensor coil 910 to the surface 922, where the surface 922 is of a given, known material, all as given in block 1002. The method then enters two nested loops, where first the temperature is set to the initial temperature, as given in block 1004, and then the distance is set to the initial distance, as given in block 1006.

The voltage of the oscillator 902 is read and recorded, as given in block 1008, and the frequency of the oscillator 902 is read and recorded, as given in block 1010. If it is desired to make the measurements at more distances, as determined in block 1012, then the desired distance between the surface 922 and the coil 910 is incremented as given in block 1014, and the method returns to block 1006. When the parameters have been measured at the last desired distance, then a decision is made as given in block 1016 to make the readings at another temperature. If so, then the desired temperature is incremented as given in block 1018, and the method returns to block 1004. If all desired temperatures have been analyzed, then the method falls to block 1020.

At this point, there has been a measurement made and recorded for both voltage and frequency at several different distances and temperatures. From this data, a plot can be constructed, such as given in FIG. 4, of voltage versus frequency at various distances and temperatures. However, it is appreciated that the plot is just for convenience in visualizing the data, and in actual implementation, a computer, such as would commonly be used for some of the steps of the method as described herein, would have no need of constructing the plots as depicted herein.

Figure 4:
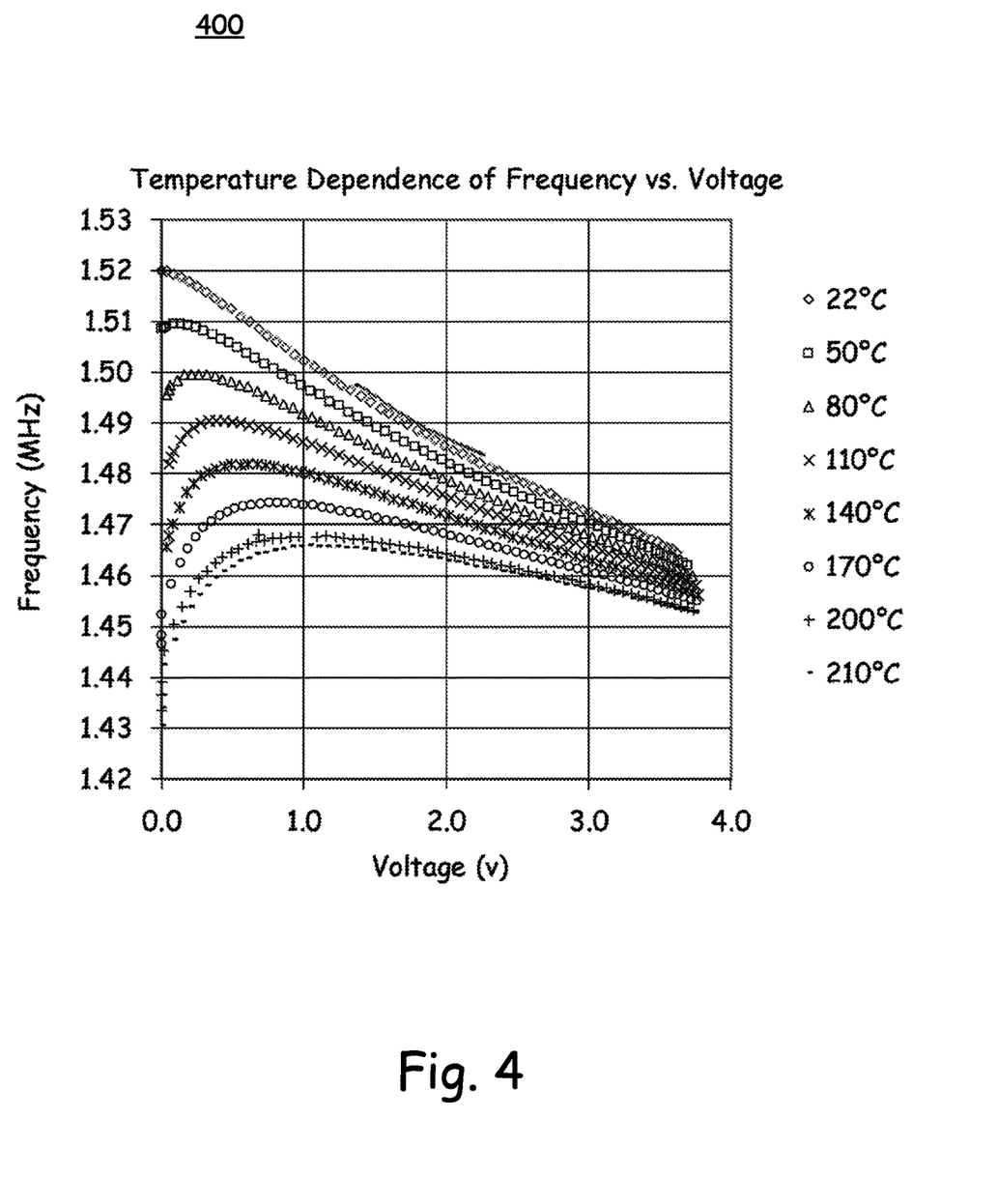
FIG. 4 is a graph of the relationship between frequency and voltage at several different temperatures for an eddy current sensor according to an embodiment of the present invention.

As can be seen in FIG. 4, the plots of voltage versus frequency at each temperature have similar shapes, but are shifted one from another. The relationships between these data sets of voltage and frequency at different temperatures can be determined and used at later steps in the method described herein.

As a first step in this embodiment of the method, a mathematical regression of each of the temperature-dependent plots is individually made, as given in block 1022, and a mathematical equation is constructed that describes the shape of the plots over the distance and voltage values of probable interest—meaning, for example, over the ranges of anticipated use of the sensor 900. In one embodiment, a fourth-order polynomial equation is used to describe the plots as having the form of:

$$F(V)=a_4 \cdot V^4 + a_3 \cdot V^3 + a_2 \cdot V^2 a_1 \cdot V + a_0$$

Figure 5:
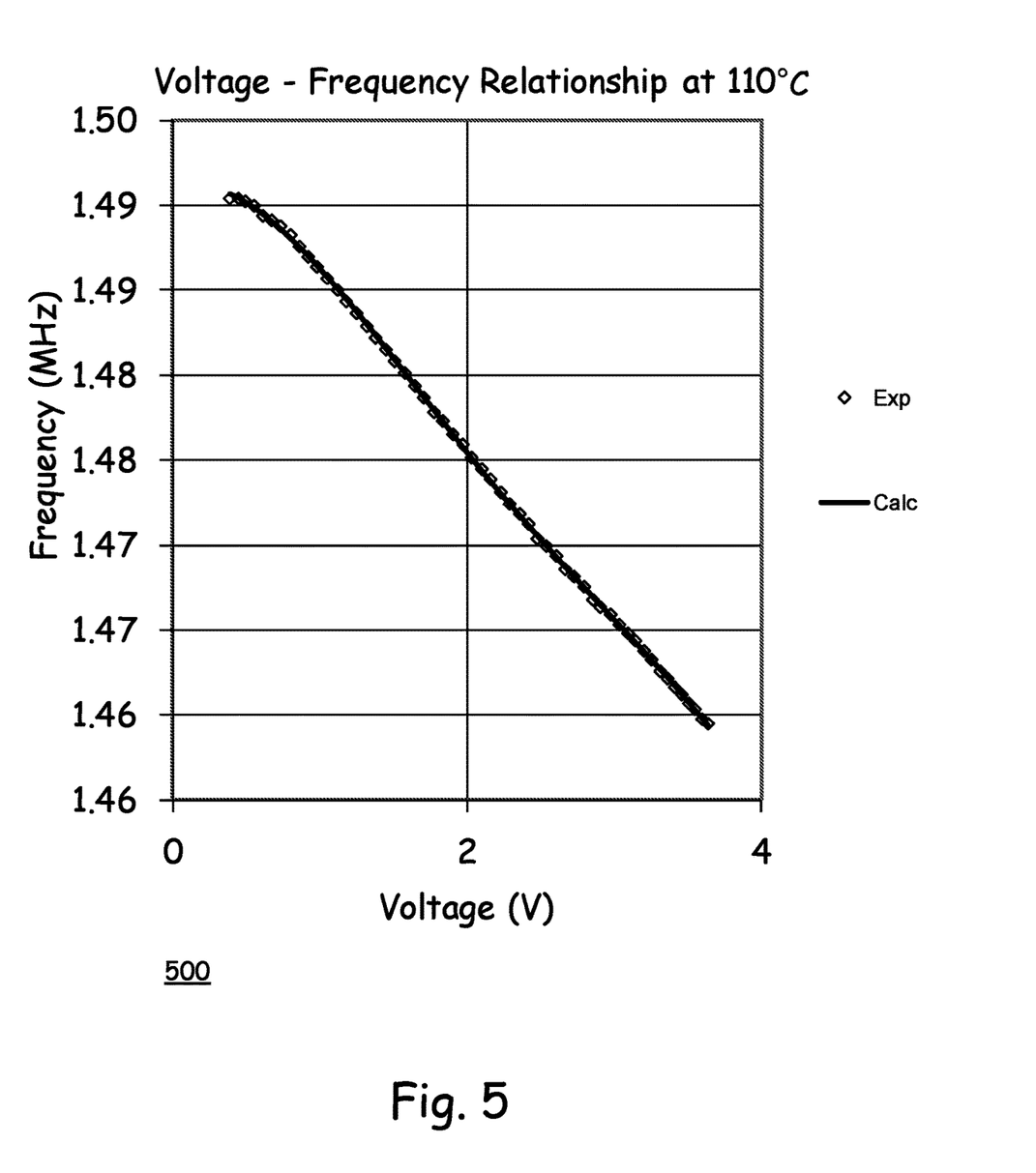
FIG. 5 is a graph of empirical and calculated relationships between frequency and voltage at a single temperature for an eddy current sensor according to an embodiment of the present invention.

Such a plot of the temperature-dependent data for one temperature and the regressed equation is depicted in FIG. 5. This process produced an equation having the form as given above for each temperature. So, if eight different temperatures were investigated, then eight different equations are produced that describe the relationship of voltage versus frequency at each of the eight temperatures. This produces eight of each of the factors $a_0$ through $a_4$ from the polynomial equations.

The parameters $a_0$ through $a_4$ are dependent on the temperature. The change in parameter versus temperature is nearly linear, and can be expressed as a function of first order, such as indicated in the equations below:

$$a_4(T)=b_1 \cdot T + b_0$$

$$a_3(T)=c_1 \cdot T + c_0$$

$$a_2(T)=d_1 \cdot T + d_0$$

$$a_1(T)=e_1 \cdot T + e_0$$

$$a_0(T)=f_1 \cdot T + f_0$$

Figure 6:
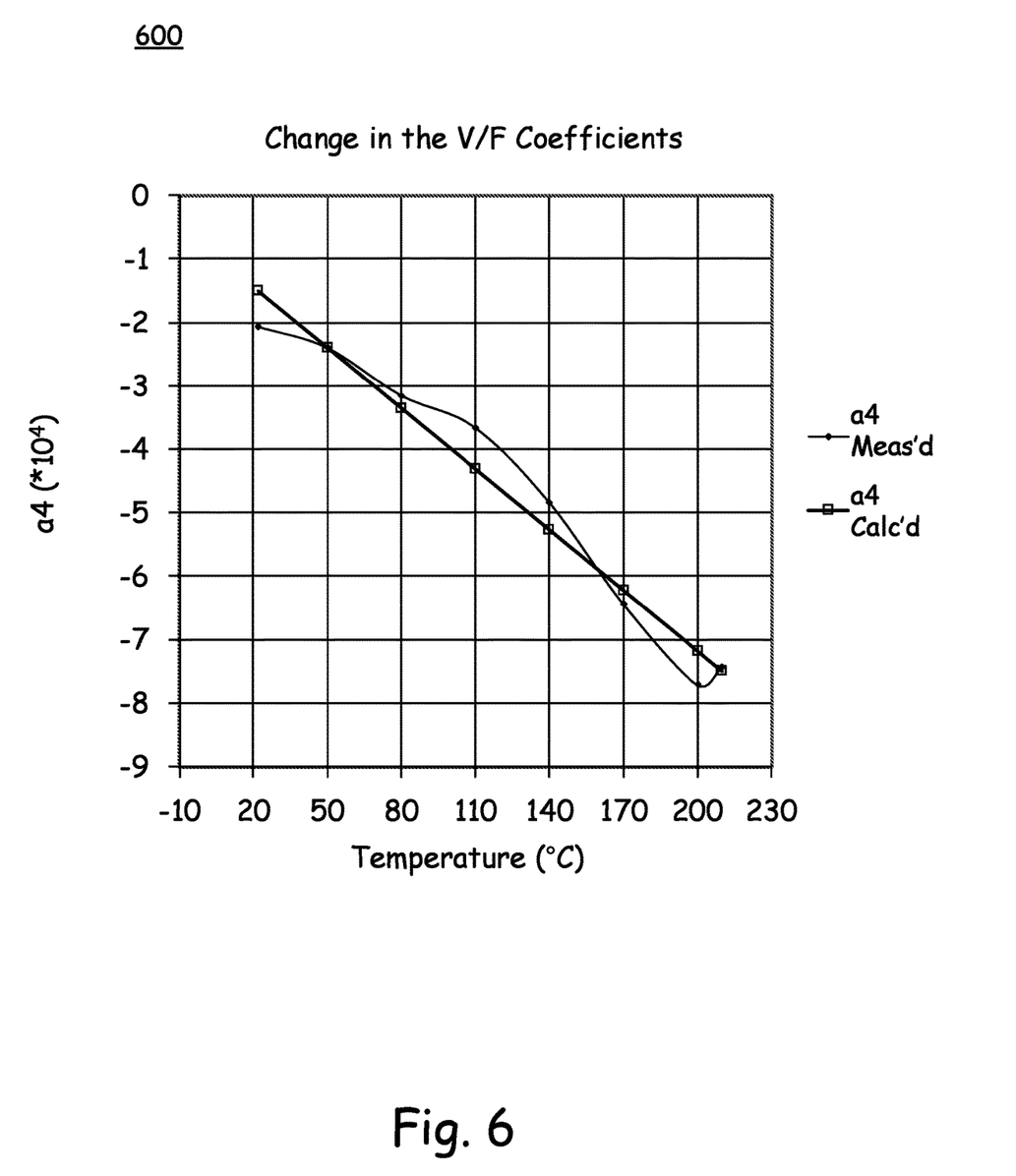
FIG. 6 is a graph of empirical and calculated regression coefficients for the relationship between voltage and temperature for an eddy current sensor according to an embodiment of the present invention.

As indicated in block 1024, it is possible to regress mathematical equations that describe each of the variables $a_0$ through $a_4$. In other words, an equation is created by which one can input the temperature, and the desired coefficient is output. Such a plot is depicted in FIG. 6 for calculated and measured values of $a_4$. In this manner, once the temperature is known, the equations created for each coefficient in block 1024 can be used to produce the coefficients that are required for each equation that describes the relationship between voltage and frequency, as determined in block 1022. Thus, with a knowledge of the frequency and voltage of the oscillator 902, the sensor 910 temperature can be derived, and the compensation values for the temperature can be applied to the gain and offset in either the controller of the oscillator 902 via line 906.

Figure 7:
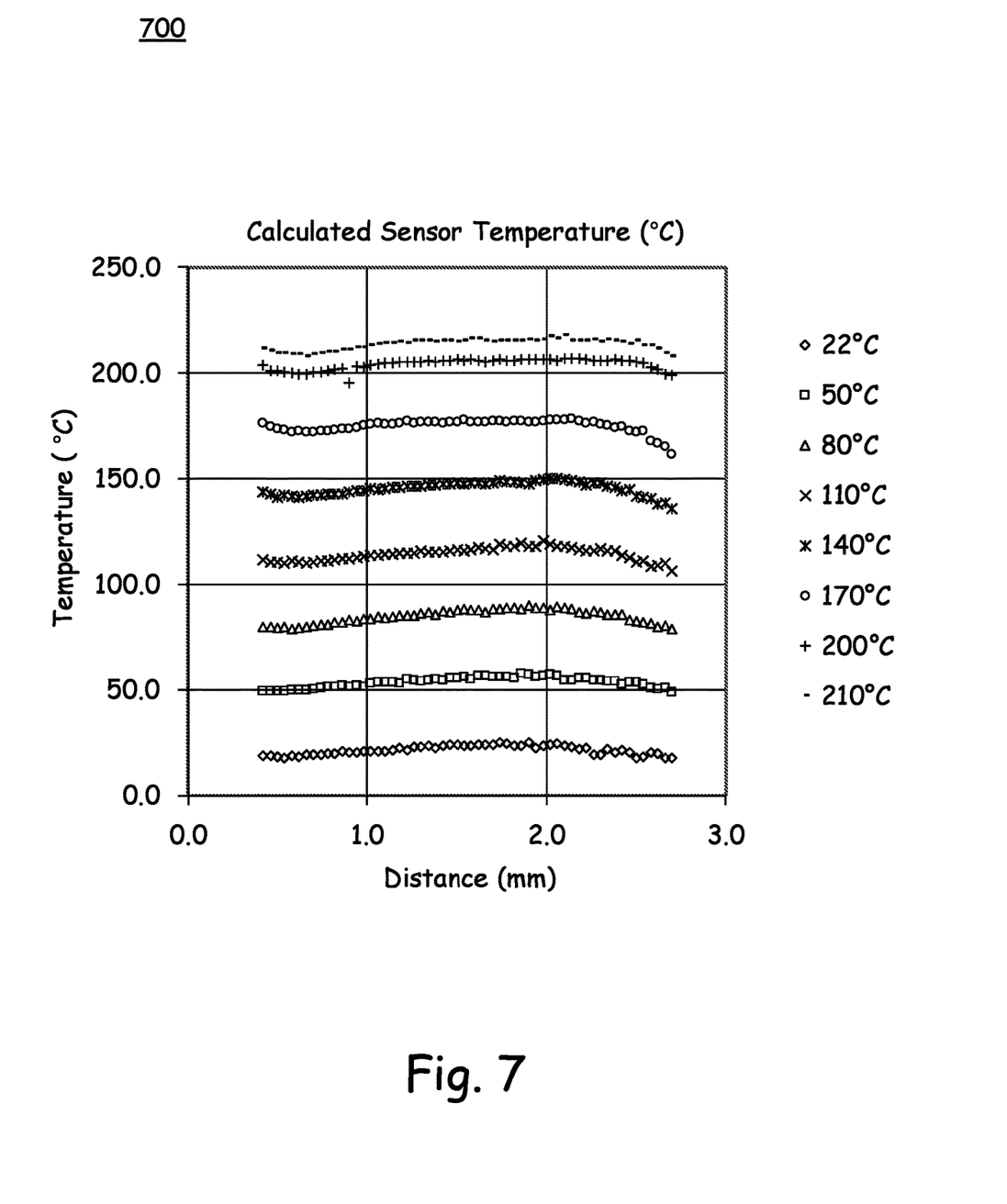
FIG. 7 is a graph of linearity of calculated temperature at various actual temperatures over various distances for an eddy current sensor according to an embodiment of the present invention.
Figure 11:
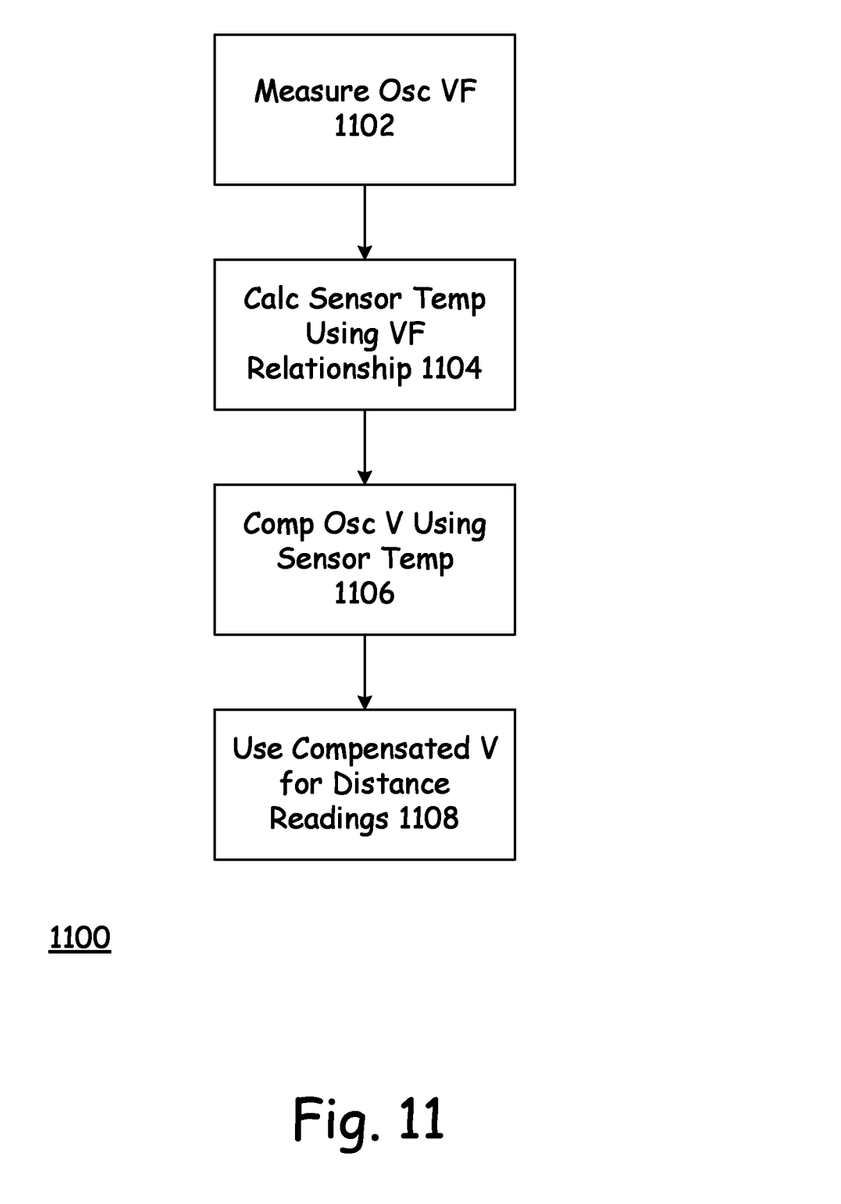
FIG. 11 is a flow-chart for taking eddy current sensor measurements using a calibrated eddy current sensor according to an embodiment of the present invention.

When actually taking measurements with the sensor chain 900, after the calibration has been performed, the method 1100 as depicted in FIG. 11 is used. With a knowledge of the oscillator voltage and frequency, as measured in step 1102, one can use the equations of steps 1022 and 1024 to match up with tabulated data for the coefficients (produced during a calibration routine as described above, where all the data is measured at known temperatures and distances) to determine the temperature, as given in block 1104, which can then be used to correct the voltage output of the oscillator 902 by adjusting the gain and offset of the oscillator 902, as given in block 1106, to determine the actual distance between the sensor coil 908 and the surface 922, as given in block 1108. In this manner, temperature corrected readings for the distance can be made without any additional electronics or temperature measurement equipment. This is graphically depicted in chart 700 of FIG. 7.

For example, the equations introduced above can be rewritten in terms of temperature, as given below:

$$T(V,F)=(F-(b_0V_4+c_0V_3+d_0V_2+e_0V+F_0))/(b_1V_4+c_1V_3+d_1V_2+e_1V+F_1)$$

This procedure yields the ability to calculate sensor 908 temperatures from two measured variables, the oscillator voltage (or current) and the oscillator frequency.

Figure 8:
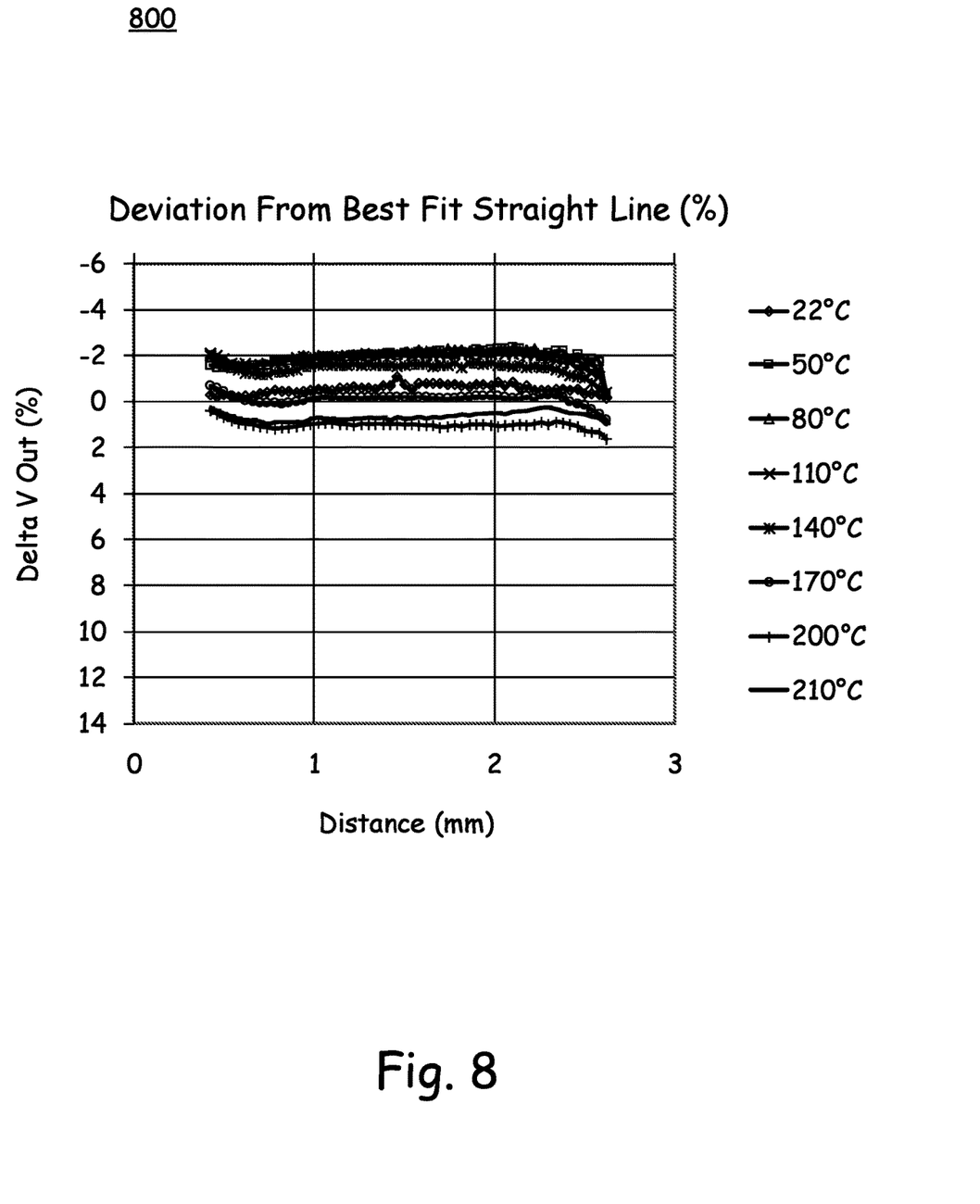
FIG. 8 is a graph of the deviation of voltage for the regressed relationship at various temperatures and distances for an eddy current sensor according to an embodiment of the present invention.

As introduced above, the oscillator 902 gain and offset are preferably adjusted to achieve a desirable straight-line regression without temperature dependency. The gain and offset values produced as a result of the measurements at the different sensor 908 temperatures, as described above, with the oscillator 902 adjusted to achieve the output results at all temperatures as though they were produced at the standard temperature, such as 23° centigrade. Once these changes are made, temperature variations in the sensor chain 900 are dramatically reduced, as depicted in chart 800 of FIG. 8.

Figure 12:
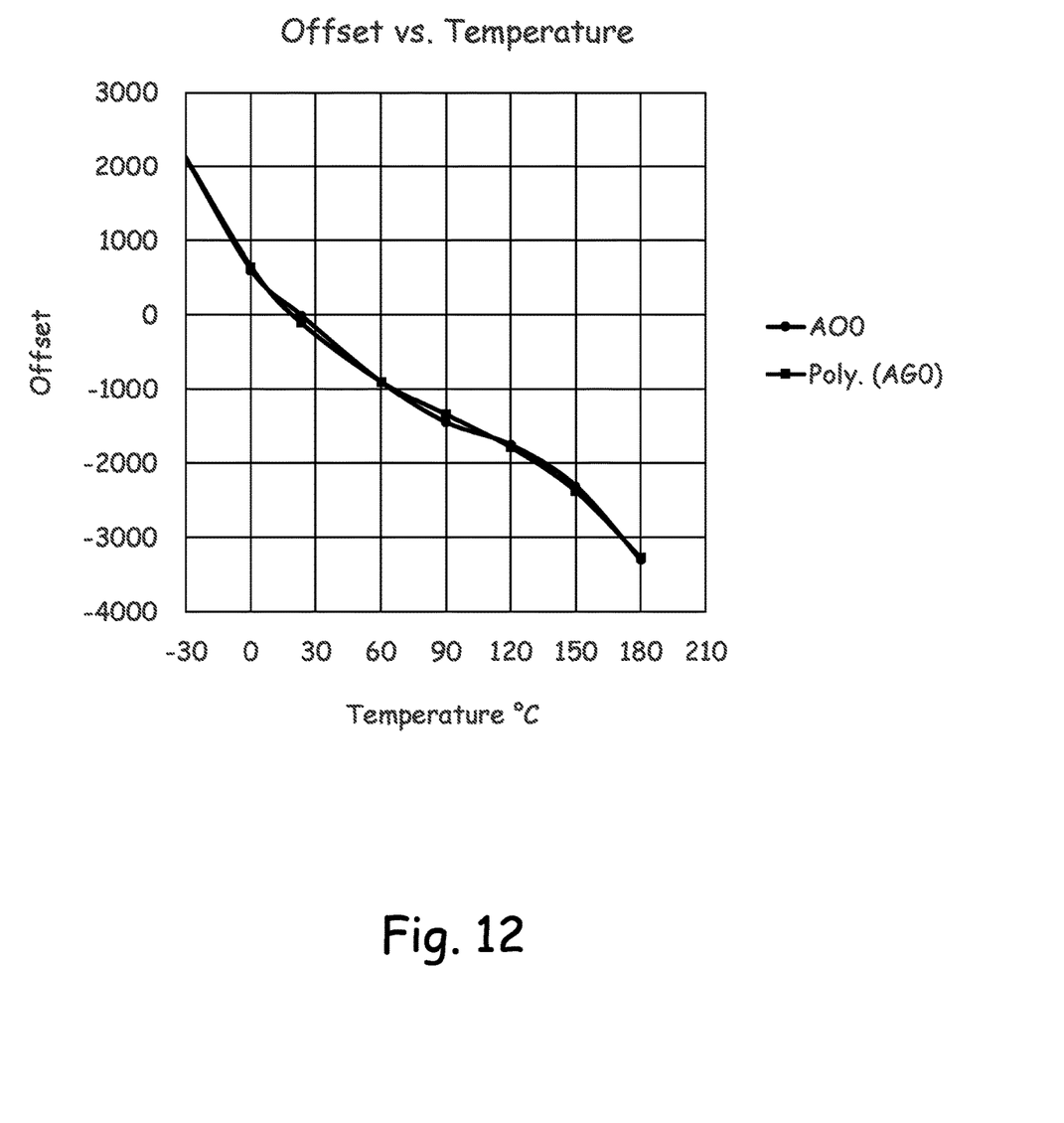
FIG. 12 is a graph comparing measured versus regressed oscillator offset adjustments versus temperature according to an embodiment of the present invention.
Figure 13:
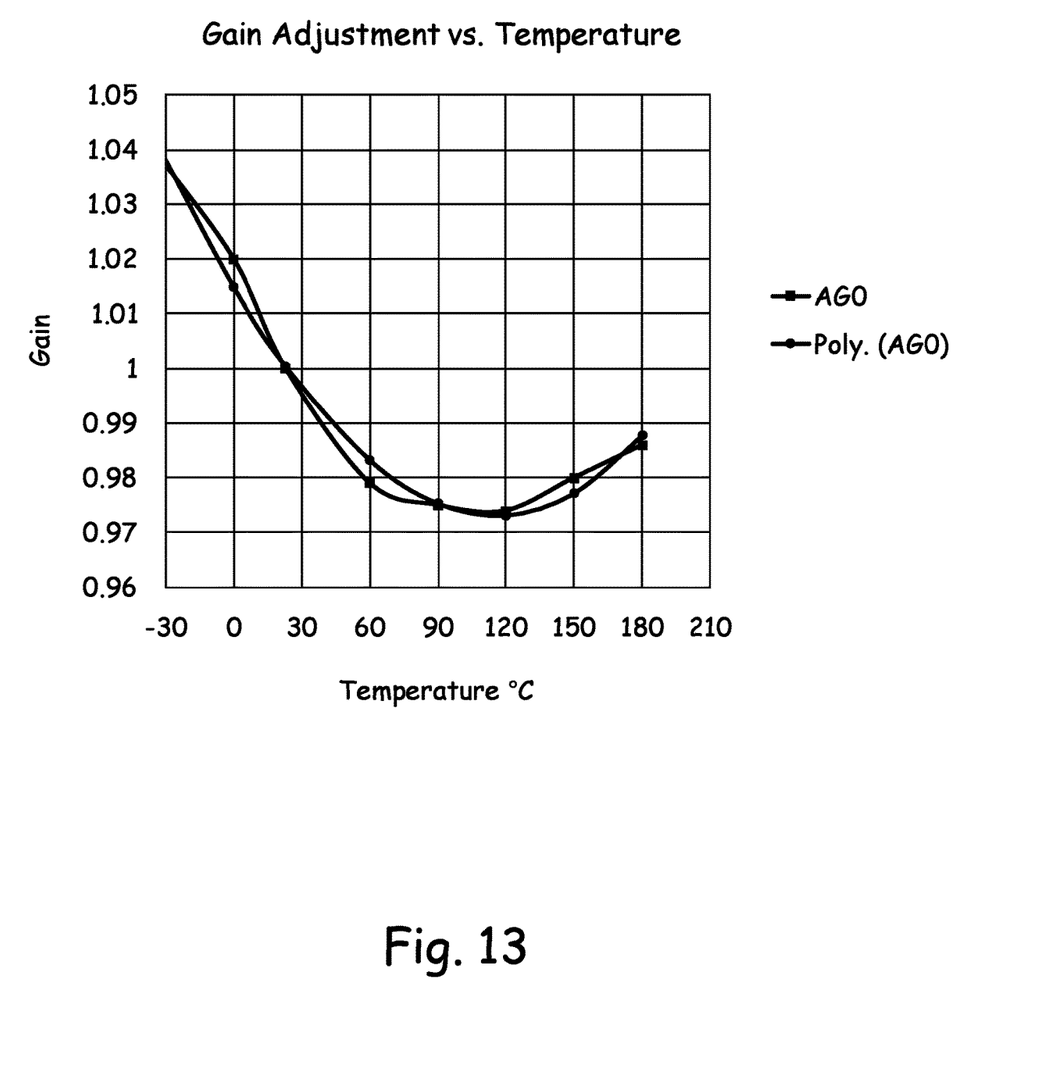
FIG. 13 is a graph comparing measured versus regressed oscillator gain adjustments versus temperature according to an embodiment of the present invention.

The temperature-dependent adjustments are graphically depicted in FIGS. 12 and 13. Using the data from the calibration phase of the process, as described in more detail herein above, the adjustments that are needed to the gain and offset of the oscillator 902 inputs are determined, and then a mathematical relationship is regressed using those values, so that adjustments can be made at all temperatures along a continuum within the regressed range of the equation (and in some embodiments extrapolated outside of the regressed temperature range). In this manner, the controlling variables for the oscillator 902—offset and gain—are adjusted according to the temperature of the system as measured by the voltage (or current) and frequency of the oscillator 902, so that the output of the sensor chain 900 is compensated for the environmental temperature, and reflects an accurate representation of the output of the sensor 908, such as distance to the surface 922.

The measurement of the frequency can be carried out in a simple manner, but in some embodiments is accomplished as precisely as possible. An internal counter of the controller 918 can be used to adjust of the sensor chain 900 for measure frequency. To determine the frequency, in one embodiment, the frequency signal processed by the resonant circuit is evaluated. A timer configured as a counter (timer$_0$) detects the rising edge on the controller 918. For an 8-bit counter, for example, after 256 counting steps, this triggers an interrupt. Each timer$_0$ interrupt increases the register value by 1. Timer$_1$ (T$_1$) is started almost simultaneously with T$_0$. The 16 bit timer$_1$, which is clocked with a controller clock frequency, stops the timer$_0$ and its interrupt enable on its first overflow. By evaluating the timer$_0$ overflows and the current count of timer$_0$, the frequency can now be determined, since timer$_1$ provides a fixed period in which the number of rising edges is counted. The pulse counter indicates the number of pulses that occur up to the timer$_1$ overflow on the controller. The value of the pulse counter is calculated as:

$$\text{Pulses}=T_0\_\text{Interrupts}\times 2^8+T_0\_\text{Rests}$$

The measurement period can be determined by:

$$\text{Period}=T_1\_\text{Overclock}/2^{16}$$

Where the multiplier is inherent with the data width of timer$_1$. The frequency can then be determined as:

$$\text{Frequency}=\text{Pulses}/\text{Period}$$

If the clock frequency is too high or the difference between the data width between timer$_0$ and timer$_1$ is too small, timer$_1$ can also be started several times to obtain a safe result with low measurement uncertainty.

In various embodiments according to the present invention, the temperature compensation technology as described herein is used with different types of eddy current sensors 900, such as a converter with a voltage output that is proportional to the distance between the surface 922 and the coil 910, a transmitter with a current output that is proportional to the distance between the surface 922 and the coil 910, and a transmitter with a current output of a characteristic value, such as the effective value of the vibrational portion of the distance between the surface 922 and the coil 910. Other embodiments are also contemplated herein The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for calibrating an eddy current sensor for temperature, the method comprising the steps of:
   measure both frequency and one of voltage and current of an oscillator driving the eddy current sensor at a plurality of temperatures and a plurality of target surface distances,
   regress temperature equations to fit the measured frequency and one of the voltage and the current for each temperature, where the temperature equations have a common number of equivalent factors, regress factor equations for each of the equivalent factors,
   determine for an oscillator associated with the eddy current sensor a gain adjustment and an offset adjustment pair for each of the plurality of temperatures that compensates an output of the eddy current sensor to a standard temperature,
   regress a gain equation to fit the determined gain adjustments, regress an offset equation to fit the determined offset adjustments, and providing the temperature equations, factor equations, gain equation, offset equation with the eddy current sensor, read frequency and one of voltage and current of an oscillator associated with the eddy current sensor, input the frequency and the one of voltage and current into provided temperature equations to determine a temperature, input the temperature into a provided a gain equation to determine a gain adjustment, input the temperature into a provided offset equation to determine an offset adjustment, and adjust the oscillator using the gain adjustment and the offset adjustment.

2. A method for calibrating and correcting an eddy current sensor for temperature, the method comprising the steps of:

calibrate the eddy current sensor by, measure both frequency and one of voltage and current of an oscillator driving the eddy current sensor at a plurality of temperatures and a plurality of target surface distances, regress temperature equations to fit the measured frequency and one of the voltage and the current for each temperature, where the temperature equations have a common number of equivalent factors, regress factor equations for each of the equivalent factors, determine for an oscillator associated with the eddy current sensor a gain adjustment and an offset adjustment pair for each of the plurality of temperatures that compensates an output of the eddy current sensor to a standard temperature, regress a gain equation to fit the determined gain adjustments, regress an offset equation to fit the determined offset adjustments, and provide the temperature equations, factor equations, gain equation, and offset equation with the eddy current sensor, and correct the eddy current sensor by, read frequency and one of voltage and current of an oscillator associated with the eddy current sensor at an unknown temperature, input the frequency and the one of voltage and current into the provided temperature equations to determine the unknown temperature, input the determined temperature into the provided gain equation to determine a gain adjustment, input the determined temperature into the provided offset equation to determine an offset adjustment, and adjust the oscillator using the gain adjustment and the offset adjustment.

* * * * *